United States Patent [19]

McCarthy et al.

[11] Patent Number: 4,642,787
[45] Date of Patent: Feb. 10, 1987

[54] FIELD PRESETTABLE ELECTRONIC ODOMETER

[75] Inventors: Timothy D. McCarthy, Palatine, Ill.; Scott T. Christians; A. Dale Olmstead, both of Buda, Tex.

[73] Assignee: Motorola, Inc., Schaumburg, Ill.

[21] Appl. No.: 635,960

[22] Filed: Jul. 30, 1984

[51] Int. Cl.[4] .................. G01C 22/00; G06F 15/36
[52] U.S. Cl. ............................... 364/561; 235/97; 364/424; 364/556
[58] Field of Search .................. 73/490, 491; 324/166, 324/171; 364/424, 442, 561, 556; 377/24; 235/95 R, 97

[56] References Cited

U.S. PATENT DOCUMENTS

| | | | |
|---|---|---|---|
| 3,683,159 | 8/1972 | Welch et al. | 377/24 X |
| 3,872,288 | 3/1975 | Sampey | 377/24 X |
| 4,031,363 | 6/1977 | Freeman et al. | 377/24 X |
| 4,176,397 | 11/1979 | Crom et al. | 364/571 X |
| 4,204,112 | 5/1980 | Lane | 235/95 R |
| 4,263,657 | 4/1981 | Oka et al. | 235/95 R X |
| 4,328,413 | 5/1982 | O'Neil et al. | 364/561 X |
| 4,344,136 | 8/1982 | Panik | 364/424 |
| 4,398,172 | 8/1983 | Carroll et al. | 340/942 |
| 4,409,663 | 10/1983 | Becker et al. | 364/561 |
| 4,528,683 | 7/1985 | Henry | 377/24 |
| 4,539,641 | 9/1985 | Kawashimo et al. | 364/561 X |

FOREIGN PATENT DOCUMENTS 2095408 9/1982 United Kingdom .

OTHER PUBLICATIONS

SAE (Society of Automotive Engineers) Electronic Displays and Information Systems SP-565, Feb. 27, 1984, pp. 49-59 and 191 to 204.

*Primary Examiner*—Felix D. Gruber
*Assistant Examiner*—Edward R. Cosimano
*Attorney, Agent, or Firm*—Phillip H. Melamed

[57] ABSTRACT

A microprocessor is utilized to store a total accumulated driven mileage (odometer) signal in a non-volatile random access memory (RAM). Trip mileage manual pushbuttons are coupled to the microprocessor and enable the calculation and display of elapsed driven mileage (trip mileage), and a units pushbutton converts the displayed total accumulated driven mileage and/or the elapsed trip mileage from a miles to a kilometer visual display. The microprocessor effectively retrieves non-volatile stored odometer signals, loads them into a microprocessor volatile memory, increments the volatile memory mileage signal in accordance with signals from an actual mileage sensor and provides a visual mileage display on an odometer display. The magnitude of the odometer signal stored in the non-volatile memory can be preset to a predetermined mileage after the non-volatile memory is coupled to the microprocessor. This presetting can only be implemented a maximum of three times and only if a non-volatile, non-presettable actual mileage memory indicates the vehicle has been driven less than ten miles. In response to a substantial adjustment of the non-volatile stored odometer signal, an overflow flag is non-volatilely stored and the odometer display provides a visual indication that this adjustment has occurred whenever the odometer display provides a visual indication corresponding to the total accumulated mileage. The presetting of the odometer signal in the non-volatile RAM is accomplished through utilization of the trip and units manual controls, and the vehicle ignition switch.

26 Claims, 5 Drawing Figures

FIELD PRESETTABLE ELECTRONIC ODOMETER

BACKGROUND OF THE INVENTION

The present invention is related to the field of electronic usemeters which develop and then display a signal magnitude representative of all total accumulated use of an apparatus. More particularly, the present invention is directed to apparatus for presetting such electronic usemeters, especially when such usemeters correspond to vehicle mileage odometers.

Typically mechanical usemeters have been utilized for keeping track of vehicle mileage (odometers), elapsed time use of mechanical equipment (hourmeters) and counting the number of revolutions of an engine crankshaft or a motor drive shaft. Such mechanical usemeters are subject to wear and therefore electronic usemeters have been developed. In addition, typically the resetting or readjusting of the mechanical usemeters is intentionally made difficult so as to prevent fraudulent tampering such as resetting an odometer to convince a used car buyer that a vehicle has been driven only rarely and only for short distances. Typically to preset or reset mechanical vehicle odometers they are either disassembled and the individual plastic "wheels" reorientated and assembled again or the drive cable to the odometer is rapidly rotated in the reverse direction to readjust the odometer reading.

It should be noted that usemeters which provide a display of total accumulated use are generally not made presettable so as to preserve the integrity of the amount of use displayed. These usemeters differ from elapsed usemeters which are readily resettable but only provide a display indicative of the amount of use between resets of the meter rather than a display indicative of total accumulated use of an apparatus. Vehicle odometers are an example of such total usemeters while vehicle trip mileage computer apparatus is an example of an elapsed usemeter.

Electronic odometers have been developed which respond to vehicle wheel rotation pulses and provide an incremented count signal related to actual travel. Since a main function of an odometer is to permanently retain a record of the total accumulated travel of the vehicle, the odometer information is stored either by constantly maintaining battery voltage to an electronic signal memory storage apparatus (volatile memory) or by storing the odometer count signal information in a non-volatile memory. The term "non-volatile" is used herein to describe an electronic signal storage apparatus which does not require the constant application of power in order to maintain stored information. When an odometer uses non-volatile storage, odometer information is typically maintained in a volatile memory in a computer, incremented in accordance with vehicle wheel rotation pulses and selectively transferred to a non-volatile memory each time the ignition switch is turned off or each time a predetermined number of miles have been traveled. Typically non-volatile memories are preferred for odometers since disconnection of the vehicle battery could result in permanent loss of odometer information in any volatile information storage system which requires the continued application of battery power to maintain the information.

Non-volatile memory odometers are typically more reliable than mechanical odometers due to their lack of mechanical parts which may wear out. Typically it is necessary to intentionally make difficult the ready adjustment of the stored odometer information in such electronic odometers to prevent unauthorized tampering with the proper mileage information. Thus after installation of the odometer generally no way is provided to adjust the odometer reading except by doing so in accordance with the normally received wheel rotation pulses. However, in certain instances it is desirable to permit some minor readjustment of the electronic odometer for automobile manufacturer factory "test drives" so that the odometer will not register these short mileage drives that are necessary to properly test the new automobile. Thus providing for a limited amount of adjustment, but not permitting unlimited adjustment of the odometer mileage is desirable, but this feature has not been provided by known electronic odometers.

In addition, in the event of the failure of an electronic odometer, it is desirable to replace the electronic odometer with a new electronic odometer having a reading preset to the estimated total actual mileage of the vehicle in which the new odometer will be installed. In present available electronic odometers this is accomplished by presetting the replacement odometer at the factory and then permanently tagging or coding the odometer so as to identify it as a substitute device to thereby put the owner of the vehicle on notice that this is a substitute odometer and not an original equipment odometer. This complicates and delays the obtaining of a substitute or replacement odometer since the adjustment of the odometer mileage will take place at the factory. In addition, this adjustment of the odometer at the factory requires special equipment. It would be more desirable to have this adjustment take place during the installation of the replacement odometer while still providing the above mentioned safeguards of preventing unlimited further adjustment while also identifying the substitute odometer as a replacement item.

SUMMARY OF THE PRESENT INVENTION

An object of the present invention is to provide a field presettable usemeter for an apparatus which overcomes the above mentioned deficiencies of prior usemeters.

In one embodiment of the present invention a field presettable electronic usemeter tor an apparatus is disclosed. The usemeter comprises usemeter means for developing a use count signal having a magnitude representative of all total accumulated use of an apparatus in response to an input sensor signal provided in accordance with actual use of said apparatus; display means coupled to said usemeter means for providing a visual display representative of the magnitude of said use count signal; non-volatile memory means coupled to said usemeter means for storing, at selected times, said use count signal in a non-volatile memory; wherein the improvement comprises preset means coupled to said non-volatile memory means for implementing a preset mode while said non-volatile memory means is coupled to said usemeter means, in response to the occurrence of predetermined conditions, for adjusting the magnitude of the use count signal stored in said non-volatile memory means in accordance with received control signals unrelated to actual use of said apparatus.

More particularly, the present invention relates to providing a vehicle odometer, as an example of the above noted usemeter, wherein the use count signal corresponds to an odometer count signal representative of total accumulated vehicle driven mileage developed in response to an input sensor signal provided in accordance with actual vehicle travel. The present invention, by providing a preset means which adjusts the odometer count signal stored in the non-volatile memory while the non-volatile memory is coupled (attached) to the odometer apparatus eliminates the need for preadjusting the non-volatile memory means to a preselected stored number prior to its insertion into the odometer apparatus. Thus the adjustment can take place in the vehicle itself, rather than in the factory.

Additional significant aspects of the present invention involve preventing implementation of the preset mode in response to the occurrence of either (a) a predetermined number of prior preset mode implementations resulting in the adjustment of the use count signal stored in the non-volatile memory means and/or (b) the occurrence of a predetermined amount of actual use of the apparatus (preferably corresponding to the attainment ot a predetermined amount of actual driven mileage when the apparatus corresponds to a vehicle odometer). These two features of the present invention permit minor adjustment of the use signal stored in the non-volatile memory means, while preventing major adjustment of this stored signal by use of the preset apparatus once a low predetermined amount of actual use has been attained.

In addition to the above recited features, the present invention provides a preset flag means which will store a non erasable signal in non-volatile memory whenever the magnitude of the use count signal stored in non-volatile memory is adjusted by more than a predetermined amount, and wherein this stored preset signal will result in providing a preset visual display as an indication that the stored non-volatile memory use signal has been substantially adjusted. All of this is accomplished in the present invention while the non-volatile memory means has already been installed in the electronic usemeter, and therefore represents the present invention providing a field presettable electronic usemeter with this feature.

In addition to the above features, the present invention contemplates the utilization of manual controls which are already present and associated with the usemeter display means for controlling the implementation of the preset mode. In the context of an electronic odometer, the present invention contemplates the use of the vehicle ignition switch which provides operative power to the vehicle ignition system, the units manual control which determines the units for the information displayed by the visual display, and trip reset and trip display manual controls associated with a trip mileage apparatus. The trip mileage apparatus is coupled to the display means for causing the display to visually indicate elapsed vehicle mileage between actuations of the trip controls rather than total accumulated vehicle mileage.

The present invention, by virtue of the above recited features has provided a field presettable electronic usemeter which can readily provide the features desired for a vehicle odometer while overcoming the deficiencies of the previous electronic odometers. Of course these principles can be readily applied to other usemeters such as elapsed time meters, revolution counter meters, and gas or electric consumption use meters.

BRIEF DESCRIPTION OF THE DRAWINGS

For a more complete understanding of the present invention, reference should be made to the drawings in which.

DESCRIPTION OF THE PREFERRED EMBODIMENT OF THE INVENTION

Figure 1:
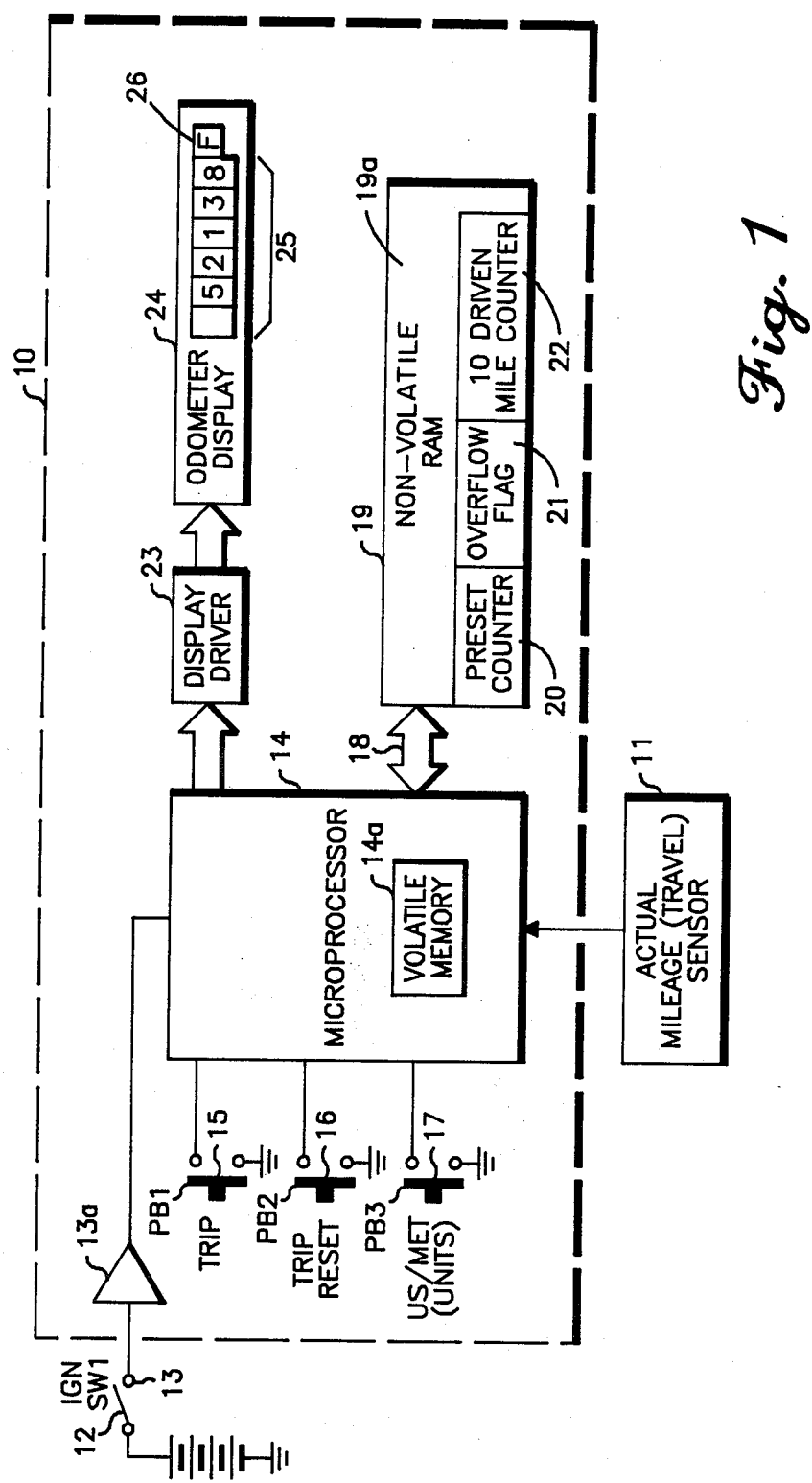
FIG. 1 comprises a combination block and schematic diagram of a field presettable electronic odometer constructed in accordance with the present invention.

Referring to FIG. 1, a vehicle field presettable electronic odometer 10 is illustrated (dashed) as receiving inputs from an actual mileage (travel) sensor 11 and a vehicle ignition switch 12 which when closed provides a positive battery supplied signal at an input terminal 13 of the odometer 10. The actual mileage sensor 11 can comprise a wheel rotation sensor which produces incrementing pulses for each revolution or partial revolution of the vehicle wheel, and the ignition switch 12 corresponds to the standard vehicle ignition switch which, when closed, supplies operative power to the vehicle ignition system and accessories which may include odometer 10.

Figure 2A:
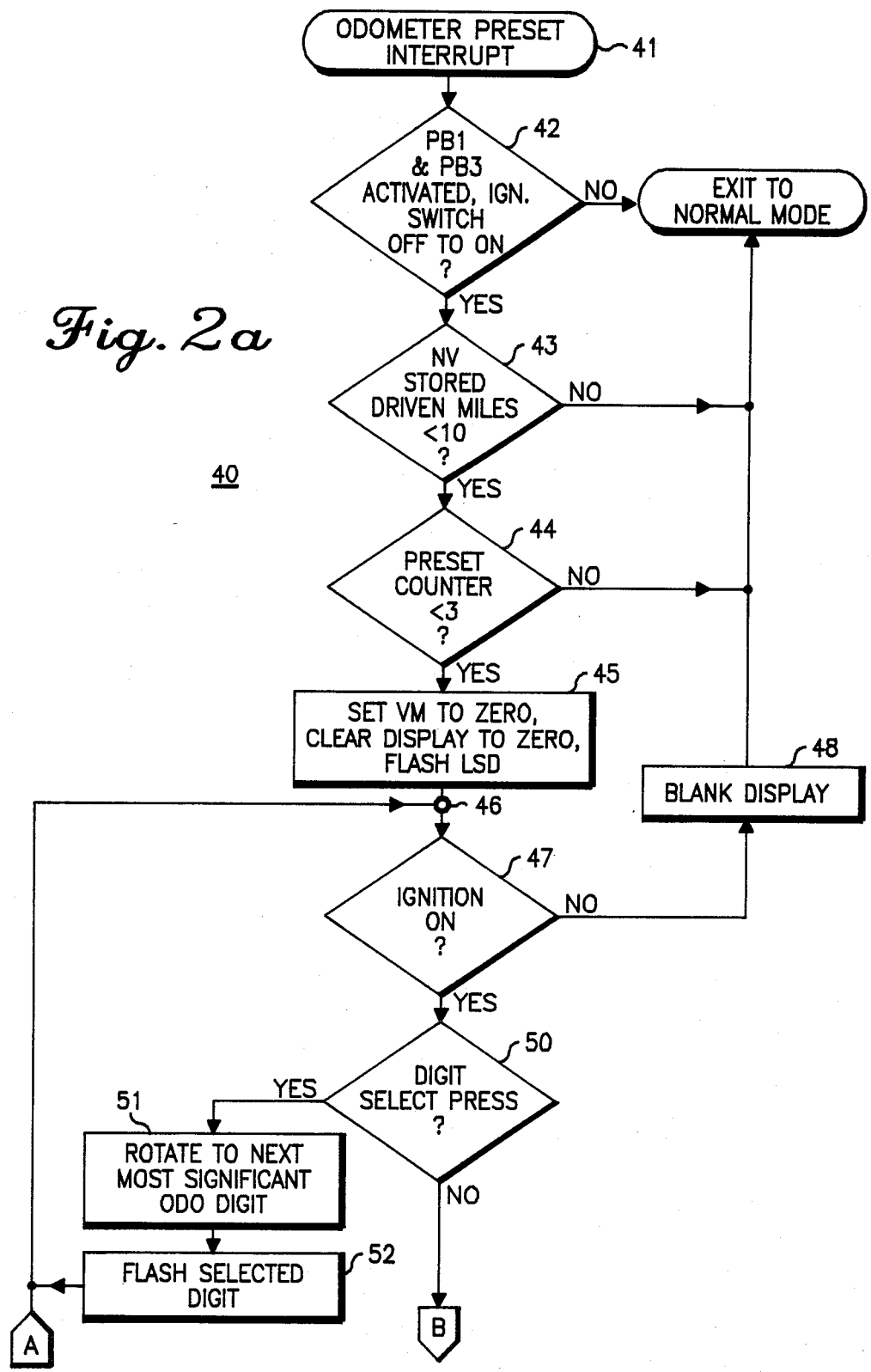
FIG. 2 comprises FIGS. 2a and 2b which together illustrate a flowchart for a preset mode of operation accomplished by the apparatus shown in FIG. 1.
Figure 2B:
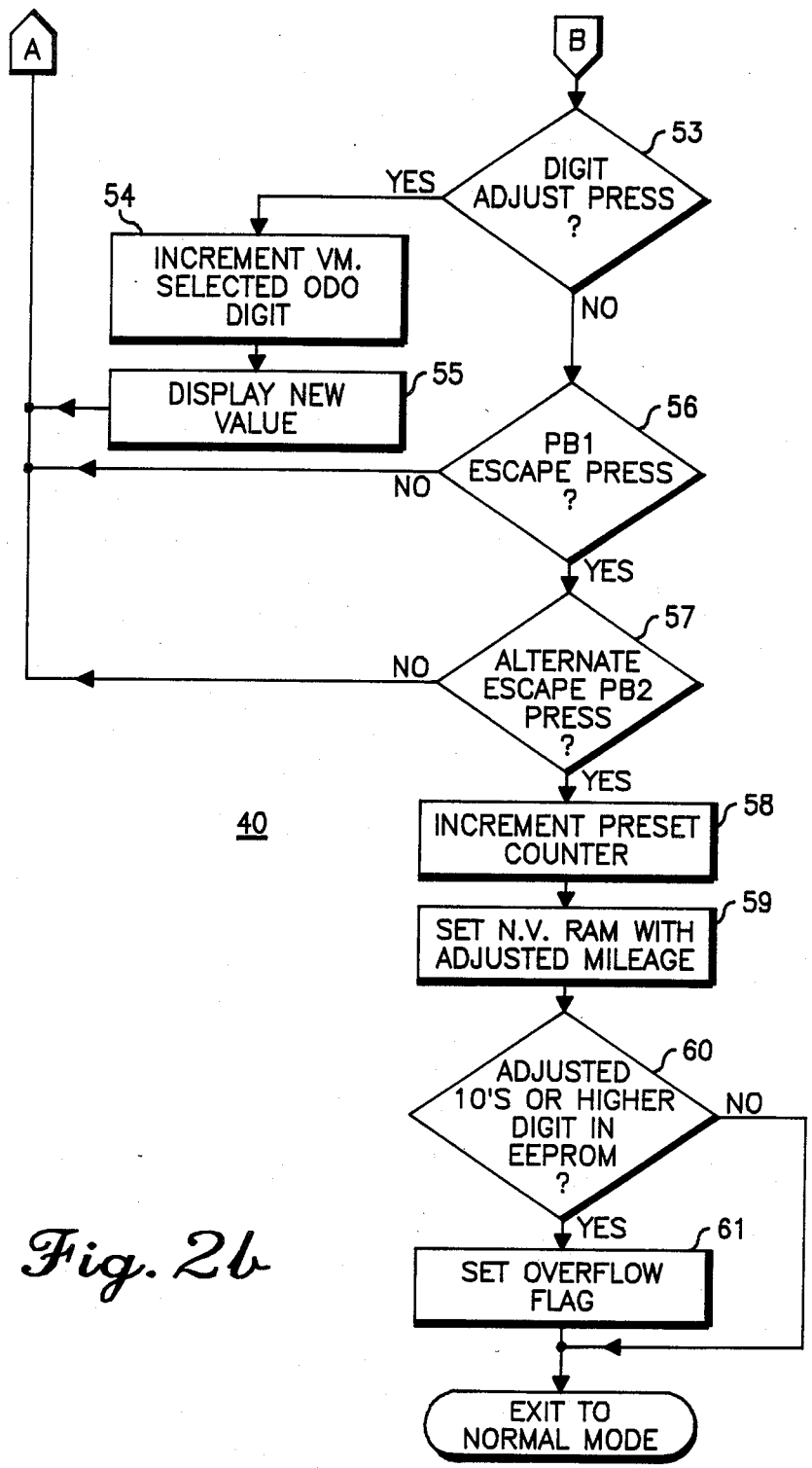
Figure 3:
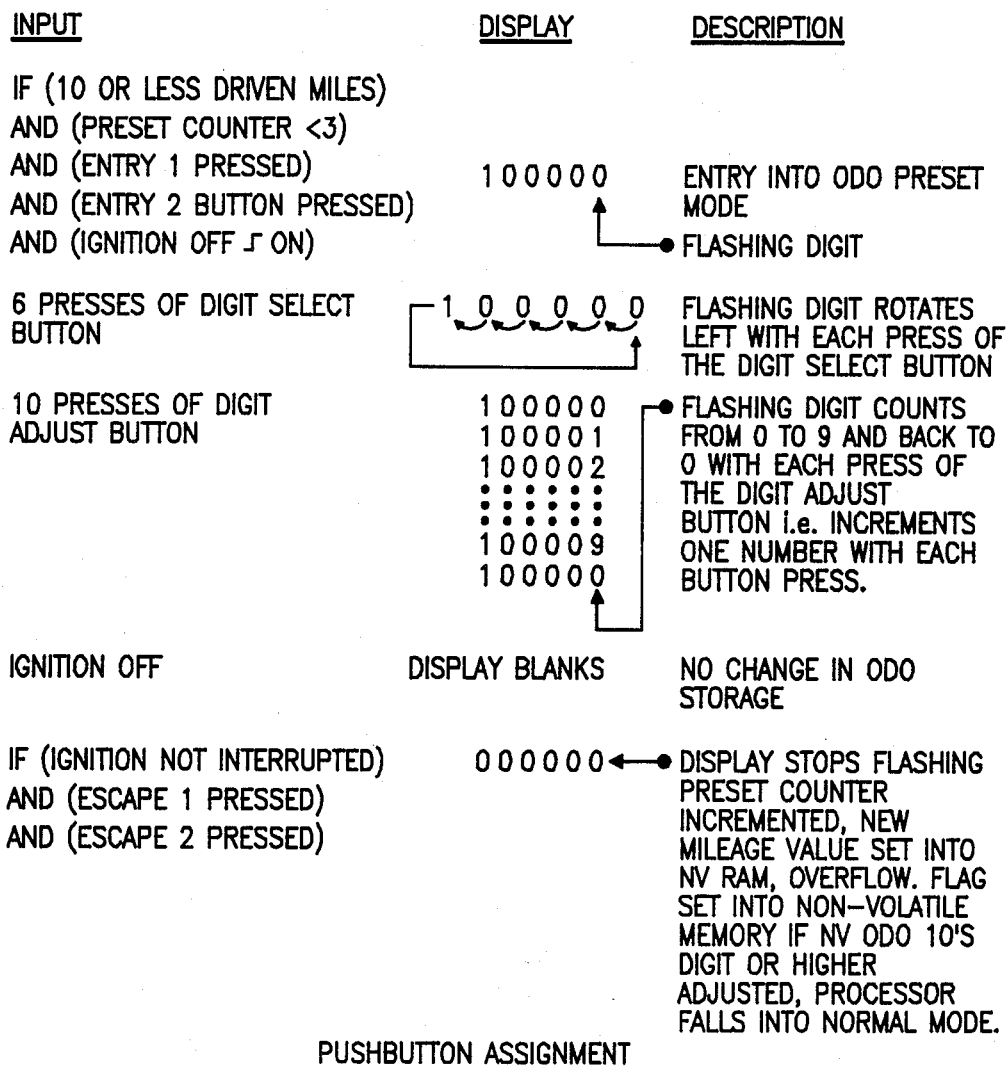
FIG. 3 comprises a table which illustrates the presetting of stored odometer information by the apparatus shown in FIG. 1.

The odometer 10 includes a microprocessor 14 which is coupled to the input terminal 13 through an amplifier 13a. In response to the closure of the ignition switch 12, the microprocessor 14 is rendered operative and will, unless implementing a preset mode of operation as indicated in FIGS. 2 and 3, implement a normal mode of operation as generally illustrated by the flowchart in FIG. 4. The microprocessor 14 receives control signal inputs from a trip display manual pushbutton 15 (PB1), a trip reset manual pushbutton 16 (PB2), and a units manual pushbutton 17 (PB3). The microprocessor also receives mileage incrementing pulses from the actual mileage sensor 11. The microprocessor 14 is bidirectionally coupled via a connection link 18 to a non-volatile RAM (random access memory) 19. Non-volatile RAM's are also sometimes referred to as EEPROM's (electrically erasable programmable read only memories).

The non-volatile memory 19 in a primary storage location 19a, stores an odometer count signal representative of all total accumulated driven mileage of the vehicle (not shown in FIG. 1) in which the odometer 10 is mounted and which the sensor 11 senses the actual travel thereof. In addition, the non-volatile RAM 19 has minor storage locations internal thereto for storing relatively small magnitude signals wherein these storage locations correspond to a preset counter storage location 20, an overflow (preset) flag location 21 and a 10 driven mile counter location 22. The preset counter storage location 20 essentially comprises non-volatile memory storage for 2 bits ot information so as to permit the storage of a binary preset count number of zero to three. The overflow flag storage location 21 comprises a single bit of storage so as to indicate whether or not an overflow flag has been set, and the 10 driven mile counter location 22 has a two bit capacity for information storage so as to non-volatilely store two bits, each indicative of five actual driven miles being attained wherein the mileage stored in the storage location 22 cannot be preset or downward adjusted by the microprocessor 14 but can only be upwardly incremented in response to the microprocessor 14 receiving travel pulses from the mileage sensor 11.

The microprocessor 14 provides visual display output signals to a display driver 23 which in turn provides amplified visual display signals to an odometer display 24 comprising at least a six digit visual display 25 and a preset or overflow flag display 26.

Figure 4:
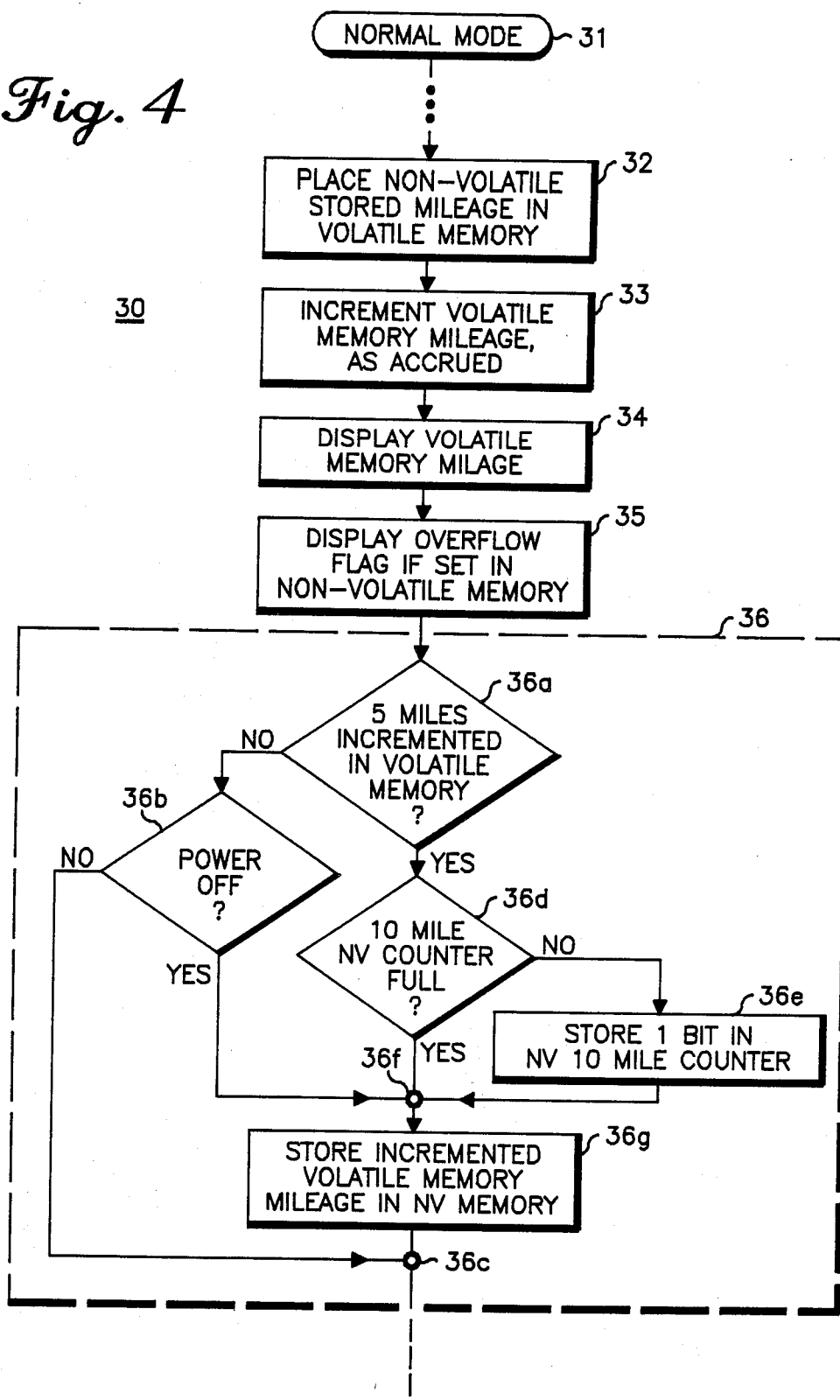
FIG. 4 is a flowchart illustrating the normal incrementing, display and storage of odometer information by the apparatus shown in FIG. 1.

The normal mode of operation of the odometer 10 is illustrated by a normal mode flowchart 30 shown in FIG. 4 which is periodically executed. The flowchart 30 is entered at an initializing block 31, and, after a number of interim steps which may be present but are not significant to the present invention and which are indicated by a dashed connection, control passes to a process block 32 representative of the microprocessor 14 retrieving the odometer stored mileage number held in the primary storage location 19a of the non-volatile RAM 19. This information is loaded into a volatile memory location 14a within the microprocessor 14 wherein this volatile memory location can comprise an accumulator in the microprocessor.

From block 32 control then passes to a process block 33 representative of the microprocessor 14 incrementing the volatile memory stored mileage information in accordance with the receipt of the actual mileage travel pulses provided by the sensor 11. Control then passes to a process block 34 representative of the microprocessor 14 outputting information to the odometer display 24 representative of the incremented mileage count stored in the internal microprocessor volatile memory 14a. Control then passes to a process block 35 representative of the microprocessor also instructing the odometer display 24 to visually display a flag at location 26 if the overflow flag in non-volatile memory location 21 has been set. Control then passes to a process block 36 shown dashed in FIG. 4 which is representative of the microprocessor 14 selectively writing into the non-volatile RAM area 19a the selectively incremented mileage being held in the volatile memory 14a in the microprocessor 14. It is contemplated that the writing of the new mileage in the non-volatile RAM area 19a by the microprocessor 14 accomplished by the process block 36 will be implemented in response to either the opening of the ignition switch 12 or the attainment of a predetermined number (5) of incremented miles as indicated by the upward incrementing of the numbers stored in the volatile storage location 14a in the microprocessor 14. This reduces the number of times odometer information must be stored in non-volatile memory and this is significant since only a finite number of non-volatile storages can be reliably implemented. The operation of block 36 is accomplished in the following manner.

As shown in FIG. 4, the process block 36 comprises a decision block 36a which determines if five miles has been incremented in the volatile memory 14a. If not control passes to a decision block 36b which determines if ignition switch 12 is open. If not, control passes to an exit terminal 36c and onto other subsequent steps not shown in FIG. 4. If decision block 36a determines that five miles has been incremented in the volatile memory location 14a since the last execution of decision block 36a, control passes to a decision block 36d which effectively determines if the 10 mile driven counter location 22 is full (has two stored bits). If not, a process block 36e stores one bit in location 22. From process block 36e control passes to a summing terminal 36f, and from there to a process block 36g which stores the incremented milage in volatile memory 14a in non volatile location 19a. Then control passes to terminal 36c. If decision block 36d determines that the 10 mile non-volatile counter location 22 is full, or if decision block 36b determines that ignition switch 12 is open, then control passes from these decision blocks to terminal 36f and process block 36g.

The net effect of the preceeding connections is to non-volatilely store current total odometer milage in location 19a for each five traveled miles or for each opening of switch 12 (which may also control the supplying of operative power to microprocessor 14 and/or display 24). This occurs while substantially insuring that non-volatile location 22 will be filled after 10 actual driven miles. The filling of storage location 22 is used to lockout implementation of the preset mode of the present invention as will be subsequently discussed.

It should be noted that currently available electronic odometers operate in substantially the same manner as the flowchart indicated in FIG. 4 with the exception of the process block 35 and the details of process block 36. The process block 35 merely represents having the odometer display simultaneously visually display a flag in response to a set condition of the overflow or preset flag location 21 while the odometer display is also displaying the actual vehicle mileage which initially will correspond to the odometer count signal stored in the non-volatile RAM area 19a and then the mileage signal in volatile memory location 14a when these signals are different. Since electronic odometers are available which generally implement the blocks 31 through 36 in FIG. 4, with block 35 also being readily implementable, no further detailed discussion of the flowchart 30 is believed necessary.

The preferred embodiment of the present invention contemplates utilization of the microprocessor 14 not only to provide the drive signals to the odometer display 24 which are indicative of total accumulated vehicle travel, but also contemplates having the microprocessor 14 implement a trip calculator function in which a display is provided, preferably also by the odometer display 24, which is indicative of the elapsed vehicle mileage which has occurred since the last actuation of the trip reset pushbutton 16. While this function is conventional, a brief discussion of the operation of the odometer 10 with regard to the trip calculator function will now be presented since a feature of the present invention resides in additional use of the trip calculation manual pushbuttons 15 and 16 by the odometer preset apparatus of the present invention.

In response to actuation of the trip reset pushbutton 16, the microprocessor 14 will store in a nonvolatile storage location contained in the RAM 19 a predetermined count equal to the actual mileage count currently held in the volatile memory 14a of the microprocessor 14. In response to actuation of the trip display pushbutton 15, the microprocessor will compare the actual mileage count signal now contained in its volatile memory 14a with the trip mileage count stored in the non-volatile memory 19, and a difference count signal will be provided to the odometer display 24 for visual display. This display can be instead of the actual odometer mileage represented by the digits 25 if a trip mileage visual flag is also indicated identifying the data as trip information, or the trip information can be provided as a display of information in addition to displayed odometer information. In any event, the operation of the microprocessor 14 in obtaining elapsed trip data and providing it as a visual display is conventional and such trip computation uses of a microprocessor in conjunction with two manual switches is well known.

The units pushbutton 17 is utilized to selectively convert the visual display provided by the digits 25 from either a U.S. mileage indication to a European metric (kilometer) indication or vice-versa. The provision of such a units pushbutton is also believed to be conventional and merely results in the microprocessor 14 delivering a different but equivalent visual display signal to the display driver 23 for ultimate display on the odometer display 24. Since the above recited operation of the pushbuttons 15, 16 and 17 is conventional, it has not been illustrated in the normal flowchart 30 shown in FIG. 4.

The essence of the present invention comprises the manner in which the odometer information comprising the total accumulated mileage of the vehicle which is stored in the non-volatile RAM 19 and selectively displayed on the odometer display 24 is preset to desired values. Typically in the case of an odometer failure, what has failed is the storage of odometer count information in the non-volatile RAM 19, and therefore typically just this memory should be replaced. Previously the non-volatile RAM 19 was preset to a desired odometer mileage count and then the RAM was inserted into the odometer 10. This presetting required adjustment at the factory in response to receipt of an order for a replacement odometer having a specific mileage. Requiring such factory adjustment delayed providing a replacement odometer and the adjustment required the use of additional presetting apparatus at the factory and this complicated the adjustment of the odometer memory. Both of these problems have been eliminated by the present invention. In addition, in order to provide a visual indication that a replacement non-volatile RAM is now used, a special code had to be inserted into the non-volatile RAM to cause the microprocessor to provide a visual replacement display indication corresponding to the preset flag visual indication 26. This required an additional coding step or the stocking of new uncoded and replacement coded odometer memories. Both of these requirements have been eliminated by the present invention which contemplates automatically coding a non-volatile RAM as a replacement RAM in response to sensing whenever a substantial change of over ten miles has been made to the odometer count stored in the non-volatile RAM 19.

It should be noted that one of the reasons the previous non-volatile memory odometers required factory adjustment of the stored odometer count in the non-volatile memory was to prevent unauthorized tampering with this number. However, the present invention prevents such unauthorized tampering by inhibiting implementation of a preset mode for the odometer mileage in response to three previous adjustments of the odometer mileage while also permitting only minor downward adjustment of the odometer mileage only if less than ten actual miles have been driven wherein this information is stored in the ten driven mile counter storage location 22. The present invention will indicate any major odometer adjustment in a replacement unit by virtue of the visual display of the preset flag at 26. Thus these features of the present invention allow the field presetting of the present electronic odometer 10 without incurring any substantial risk of undetected substantial field tampering with the odometer mileage stored in the non-volatile RAM 19. The manner of accomplishing all these beneficial results will now be discussed in detail with respect to how the flowchart in FIG. 2 and the table in FIG. 3 implement these results for the odometer 10 shown in FIG. 1.

FIG. 2 illustrates a flowchart 40 representative of how the microprocessor 14 implements a preset mode of operation in response to the occurrence of certain predetermined vehicle conditions. The flowchart 40 is entered at an initializing point 41 and proceeds to a decision block 42 which essentially determines if the trip pushbutton 15 and units pushbutton 17 have been simultaneously depressed at the time the ignition switch 12 is closed resulting in an off to on step transition for the voltage at the terminal 13. The decision block 42 represents the initial required step in order to enter the preset mode of operation of the present invention. If the conditions in the decision block 42 do not occur, then control passes to the normal flowchart 30 illustrated in FIG. 4 and a preset mode of operation is not implemented. It should be noted that of course a sequence of any pushbutton actuation could be substituted for the specific pushbutton activation requirement stated in decision block 42 if this is desired, but by providing for the simultaneous depression of two different pushbuttons at the time of the closing of the ignition switch, this greatly reduces the error of accidentally entering the preset mode of the present invention.

From the decision block 42, assuming that the depression of the pushbuttons 15 and 17 occurred simultaneously with the closing of the ignition switch 12, control passes to a decision block 43 which determines if the vehicle has driven less than ten actual miles. This is accomplished by the normal flowchart block 36e (FIG. 4) storing in the non-volatile storage location 22 a two bit count related to the actual mileage traveled by the vehicle wherein once ten miles have been driven by the vehicle the storage location 22 is full indicating that at least ten miles has been traveled. Thus decision block 43 represents the microprocessor 14 determining if storage location 22 is full.

The significance of the decision block 43 is that once ten driven miles has been effectively non-volatilely stored in the location 22 and resulted in the filling of this location, then decision block 43 will prevent any implementation of the preset mode and cause the entering of the normal mode flowchart 30. This means that once the vehicle has been driven ten miles, as indicated by location 22, it is not possible to enter the preset mode to further adjust the odometer count stored in the RAM 19. Thus only immediately after installing a new zero reading non-volatile RAM 19 which would have less than ten miles in its ten driven mile storage location 22 will the present invention be able to implement a presetting of the odometer count signal in the RAM 19. It is significant to note that the preset mode of the present invention, while permitting, under certain conditions, adjustment of the odometer count signal stored in the primary storage location 19a of the RAM 19, cannot adjust any of the storage signals in the ten driven mile counter storage location 22, and that the microprocessor 14 must increment the effective count in the storage location 22 in accordance with the received pulses from the actual mileage sensor 11 as per flowchart 30.

Assuming that decision block 43 has determined that less than ten driven miles has occurred for the vehicle by monitoring the mileage figure stored in the location 22, control passes to a decision block 44 which determines if the preset counter storage location 20 has a magnitude of less than three. If not control passes to the normal mode flowchart 30 shown in FIG. 4. The function of the decision block 44 is to permit no more than three minor presets of the odometer count signal in the RAM 19 to compensate for short duration factory test drives. Of course the selection of the number three for the number of test drives is arbitrary. Block 43 insures that these presets can not reduce an actual true odometer mileage reading once ten actual miles have been driven. Essentially the decision block 44 will inhibit implementation of the preset mode after three prior implementations of the preset mode have resulted in adjusting the odometer count signal held in the primary storage location 19a of the RAM 19. The manner in which the preset counter is incremented will be discussed subsequently.

Assuming that decision block 44 has determined that three prior implementations of the preset mode have not resulted in altering the odometer count in the RAM 19, since the preset count is less than 3, control passes to a process block 45 wherein the microprocessor 14 sets its volatile memory 14a to zero, clears the odometer display 24 to provide a corresponding zero display and commences to flash the least significant digit of the odometer display. The process block 45 represents the first true step in the preset mode of the present invention. From the process block 45 control passes to a summing terminal 46 and then on to a decision block 47 which determines that the ignition switch 12 is being maintained in an on condition. If during the preset mode the ignition switch is opened, decision block 47 will result in an immediate exit from the preset mode and control will pass to a process block 48 which results in the blanking of the display 24, and then the normal mode flowchart 30 is entered. To indicate this the decision block 47 has been placed in a location where it is expected to be repetitively entered during execution of the preset mode. If the ignition switch is kept on, control from block 47 passes to a decision block 50 which determines if the flashing digit is the one to be adjusted. If the adjustment of another digit is desired, this is accomplished by actuation of a digit select pushbutton which corresponds to the trip reset pushbutton 16. The selection of a digit for adjustment is indicated by the process blocks 51 and 52 in FIG. 2 as well as by reference to the table shown in FIG. 3 which graphically depicts the selection and desired incrementation of a selected digit. The incrementation of the digits is essentially performed by a decision block 53 and associated process blocks 54 and 55 in the manner generally indicated in FIGS. 2 and 3.

It should be noted that process block 45 includes the step of setting the volatile memory 14a in the microprocessor 14 to zero and then clearing the odometer display to zero in accordance with the zero setting of the volatile memory of the microprocessor. Thus in the preset mode the odometer display 24 will again, as in flowchart 30, actually display the reading of the volatile memory 14a of the microprocessor 14, and it is this volatile memory reading which is adjusted by the decision and process blocks 50 through 55. Specifics of the manner in obtaining this adjustment are believed to be adequately disclosed by the flowchart in FIG. 2 and the table in FIG. 3 since this adjustment process corresponds to the conventional adjustment normally utilized in the setting of digital electronic clocks and watches.

After any adjustment of the volatile memory 14a of the microprocessor 14 to a desired magnitude in the preset mode, control will effectively pass to decisions blocks 56 and 57 which will maintain the preset mode in existence until the simultaneous depression of the trip pushbuttons 15 and 16. This is because unless pushbuttons 15 and 16 are simultaneously depressed control from blocks 56 and 57 will pass to terminal 46. Again by requiring the simultaneous depression of two pushbuttons, this substantially eliminates the possibility of inadvertently terminating the preset mode with the result being an undesired adjustment of the non-volatile stored odometer count signal in the RAM 19.

Assuming that the trip pushbuttons 15 and 16 are simultaneously depressed while in the preset mode, control will pass to a process block 58 which will effectively result in incrementing the preset counter count stored in the preset counter storage location 20 in the non-volatile RAM 19. The significance of the process block 58 is that it provides a count of how many times the preset mode has been implemented and then properly terminated so as to attempt adjustment of the mileage in the non-volative RAM location 19a. The decision block 44 will utilize this information to determine if subsequent entry to the preset mode is to be permitted.

From the process block 58 control passes to a process block 59 which represents loading the signal in the microprocessor volatile memory 14a into the non-volatile RAM location 19a as the new odometer count signal being held in the RAM 19. Thus process block 59 results in altering the stored odometer count signal in the non-volatile RAM 19 in accordance with control signals which are unrelated to actual vehicle travel. This is because these control signals are provided in response to actuation of the trip pushbuttons 15 and 16 and the units pushbutton 17. It is significant to note that through the utilization of the existing trip pushbuttons and the units pushbutton, the presetting of a new non-volatile RAM 19 can be accomplished without any additional apparatus or circuitry once the RAM has been installed into the odometer 10. This allows the field presetting of the odometer 10 rather than requiring a factory presetting of a RAM to a pre-specified mileage figure. Also this readily permits the automobile manufacturer to utilize existing odometer associated manual control switches to implement re-zeroing of the odometer count signal after factory test drives of the vehicle if less than ten total driven miles have occurred.

After the process block 59, control passes to a decision block 60 which determines if, when the process block 59 was implemented, there was a change which is representative of a change of ten or more miles in the stored odometer count signal in location 19a. This is determined by whether, when the process block 59 was implemented, a ten or higher digit was present in the microprocessor volatile memory number which was then transferred to the non-volatile RAM location 19a. If so, an overflow or preset flag is set in the non-volatile storage location 21 by the microprocessor 14 as specified in the process block 61 in FIG. 2. Control then passes to the normal mode of operation shown in FIG. 4 from the process block 61, whereas if less than a ten mile change has been implemented in the preset mode, the decision block 60 will directly enter the normal flowchart 30 shown in FIG. 4 without setting the overflow (preset) flag location 21.

The significance of the setting of the overflow or preset flag 61, is that for installing a replacement odometer memory 19 a substantial change from zero to some large predetermined odometer count signal to be stored in the RAM 19 is intended. This means that for such an intended change, an indicating signal will now be permanently stored in the non-volatile storage location 21 which will then, by virtue of the microprocessor 14 via normal flowchart block 35, result in providing a visual display at the location 26 indicating that this is a replacement non-volatile RAM 19. Thus since originally a zero count signal was provided in the volatile memory 14a of the microprocessor 14 and then a substantial odometer signal was provided in the volatile memory 14a and then transferred to the non-volatile RAM 19, in response to this the preset or overflow flag location 21 has been set which will result in display location 26 being activated by the microprocessor 14 whenever it simultaneously displays the new odometer count signal via the digits 25.

It should be noted that the present invention as illustrated in the flowchart 40, will not permit any substantial tampering of the stored odometer count signal in the RAM location 19a because presetting of this signal is not permitted for any actual driven mileage over ten miles. If desired, just prior to delivery of a new car to the owner, all further odometer preset adjustment can be prevented by executing three times the sequence of closing the ignition switch 12 while pushbuttons 15 and 17 are simultaneously depressed and then simultaneously activating pushbuttons 15 and 16. This insures that the preset counter will have a count of 3 and prevents any further odometer adjustment by the owner or dealer. In addition, even the new car factory may not adjust or re-zero the odometer count more than three times. If a major change is required, such as is the case when a replacement odometer non-volatile RAM 19 must be utilized, then in response to implementing a substantial change in the stored odometer count signal in the RAM 19, a preset or overflow flag will be set to indicate that this is a replacement unit. This feature avoids having to stock separate replacement coded RAMs as well as original equipment RAMs thus providing another advantage for the present invention.

It should be noted that standard terminology used for setting information into a non-volatile RAM comprises the terminology of "blowing" the RAM to irreversably set/store certain voltage levels into the RAM wherein it is known that this can only be accomplished a finite number of times for non-volatile memory device.

Certainly the present invention, instead of being utilized solely for an odometer, has application for hourmeter and revolution counter devices. In fact, in any use meter where the use of an apparatus is to be monitored and a use count signal representative of the total accumulated use of the apparatus is to be non-volatilely stored the present invention can be utilized.

While specific embodiments of the present invention have been shown and described, further modifications and improvements will occur to those skilled in the art. All such modifications which retain the basic underlying principles disclosed and claimed herein are within the scope of the present invention.

What is claimed is:

1. A field presettable electronic usemeter, for an apparatus, comprising:
   usemeter means for developing a use count signal having a magnitude representative of total accumulated use of an apparatus in response to an input sensor signal provided in accordance with actual use of said apparatus and in response to a stored use count signal;
   display means operatively connected to said usemeter means for providing a visual display representative of the magnitude of said use count signal;
   non-volatile memory means operatively connected to said usemeter means for storing, at selected times, said use count signal in a non-volatile memory and thereby providing said stored use count signal;
   wherein the improvement comprises,
   preset means operatively connected to said non-volatile memory means for implementing a preset mode while said non-volatile memory means is operatively connected to said usemeter means, in response to the occurrence of predetermined conditions, for adjusting the magnitude of the use count signal stored in said non-volatile memory means in accordance with received control signals unrelated to actual use of said apparatus such that the magnitude of said stored use count signal is unrelated to the total accumulated use of said apparatus as determined by said usemeter means prior to said implementation of said preset mode.

2. A usemeter according to claim 1 which includes inhibit means operatively connected to said preset means for prohibiting the implementation of said preset mode in response to the occurrence of at least a condition (a) comprising a predetermined number of prior preset mode implementations resulting in adjustment of the magnitude of the use count signal stored in said non-volatile memory means, whereby presetting the magnitude of the stored use count signals is only permitted a predetermined number of times.

3. A usemeter according to claim 2 wherein said inhibit means includes a preset counter means for effectively counting the number of preset mode implementations which result in altering the magnitude of the use count signal stored in said non-volatile memory means and which includes additional non-volatile memory means for storing said preset count as a number.

4. A usemeter according to claim 3 wherein said inhibit means prevents implementation of said preset mode in response to said stored preset count being more than a predetermined number.

5. A usemeter according to claim 4 wherein said predetermined number is a whole number more than one but less than ten.

6. A usemeter according to claim 5 wherein said apparatus comprises a vehicle and said usemeter means includes means for causing said use count signal to be representative of vehicle use.

7. A usemeter according to claim 6 wherein said use count signal is representative of vehicle mileage travelled and wherein said usemeter corresponds to a vehicle odometer.

8. A usemeter according to claim 1 which includes inhibit means operatively connected to said preset means for prohibiting the implementation of said preset mode in response to the occurrence of at least a condition comprising the occurrence of a predetermined amount of actual use of said apparatus.

9. A usemeter according to claim 8 which includes actual use means for storing in non-volatile memory a signal with a magnitude representative of actual use of said apparatus in response to said input sensor signal, said preset means being incapable of adjusting said stored actual use signal, said inhibit means including means operatively connected to said actual use means for prohibiting implementation of said preset mode in response to the magnitude of said stored actual use signal corresponding to at least a predetermined amount of actual use of said apparatus.

10. A usemeter according to claim 9 wherein said apparatus corresponds to a vehicle and said use count signal and said actual use signal correspond to vehicle driven mileage.

11. A usemeter according to claim 10 wherein said inhibit means includes means for prohibiting implementation of said preset mode in response to the occurrence of at least ten actual miles having been driven as indicated by the magnitude of said actual use signal.

12. A usemeter according to claim 2 wherein said inhibit means includes means for inhibiting implementation of said preset mode also in response to the occurrence of a condition (b) comprising the occurrence of a predetermined amount of actual use of said apparatus.

13. A usemeter according to claim 1 which includes preset flag means operatively connected to said display means for providing a visual display in response to said preset means having adjusted the magnitude of the use count signal stored in said non-volatile memory means by more than a predetermined non-zero amount.

14. A usemeter according to claim 13 wherein said preset flag means, in response to said preset means having adjusted the use count signal stored in said non-volatile memory means by more than said predetermined amount, stores a flag signal in non-volatile memory, and wherein said preset flag means causes said display means to provide a visual display indicative of said stored preset flag signal simultaneously with said display means providing said visual display of said use count signal.

15. A usemeter according to claim 14 wherein a microprocessor is included as part of said usemeter means and said preset means.

16. A usemeter according to claim 1 which includes manual control means operatively connected to said display means for controlling, in response to manual actuation thereof, the visual display of said use count signal, said preset means including means for implementing/terminating said preset mode in response to at least selected manual actuation of said manual control means.

17. A usemeter according to claim 16 wherein said manual control means includes a units manual control operatively connected to said display means which, when actuated, selectively implements a units change for the use count signal information displayed by said display means, selective actuation of said units manual control also controlling implementation/termination of said preset mode by said preset means.

18. A vehicle presettable electronic odometer, comprising:
odometer means for developing an odometer count signal having a magnitude representative of the total accumulated driven mileage in response to an input sensor signal provided in accordance with actual vehicle travel and in response to a stored odometer count signal;

display means operatively connected to said odometer means for providing a visual display representative of the magnitude of said odometer count signal;

non-volatile memory means operatively connected to said odometer means for storing, at selected times, said odometer count signal in a non-volatile memory and thereby providing said stored odometer count signal;

preset means operatively connected to said non-volatile memory means for implementing a preset mode while said non-volatile memory is operatively connected to said odometer means, in response to the occurrence of predetermined conditions, for adjusting a magnitude of the odometer count signal stored in said non-volatile memory means in accordance with received control signals unrelated to actual vehicle travel such that the magnitude of said stored odometer signal is unrelated to the total accumulated driven mileage of said vehicle as measured by said odometer means prior to said implementation of said preset mode, and trip mileage means operatively connected to said display means and including a trip display manual control for selectively causing said display means to display actual elapsed vehicle mileage traveled since last actuation of a trip reset manual control, said preset means including means for implementing/terminating said preset mode in response to at least selected actuation of one of said trip manual controls.

19. An odometer according to claim 18 wherein said preset means includes means for controlling implementation/termination of said preset mode in response to selective actuation of at least both of said trip display manual control and said trip reset manual controls.

20. An odometer according to claim 18 wherein said preset means includes means for implementing said preset mode in response to simultaneous actuation of a plurality of manual controls in addition to the simultaneous occurrence of an off-to-on transition of a vehicle ignition switch which controls operative power to the vehicle ignition system.

21. An odometer according to claim 18 wherein said preset means includes termination means for terminating said preset mode in response to actuation of a plurality of manual controls, at least one of which comprising one of said manual controls in said trip mileage means.

22. An odometer according to claim 18 which includes a units manual control operatively connected to said display means which, when actuated, selectively implements a units change for the mileage information displayed by said display means, said preset means including means for controlling implementation/termination of said preset mode in response to actuation of said units manual control.

23. An odometer according to claim 18 which includes inhibit means operatively connected to said preset means for prohibiting the implementation of said preset mode in response to the occurrence of at least a condition comprising the occurrence of a predetermined amount of actual use of said apparatus.

24. An odometer according to claim 18 which includes inhibit means operatively connected to said preset means for prohibiting the implementation of said preset mode in response to the occurrence of at least a condition (a) comprising a predetermined number of prior preset mode implementations resulting in adjustment of the magnitude of the use count signal stored in said non-volatile memory means, whereby presetting the magnitude of the stored use count signals is only permitted a predetermined number of times.

25. An odometer according to claim 24 wherein said predetermined number of prior preset mode implementations is greater than one and wherein said inhibit means includes a preset counter for effectively counting the number of preset implementations which result in altering the magnitude of the odometer count signal stored in said non-volatile memory means and which includes additional non-volatile memory means for storing said preset count as a number.

26. An odometer according to claim 24, wherein said inhibit means includes means for inhibiting implementation of said preset mode also in response to the occurrence of a condition (b) comprising the occurrence of a predetermined amount of actual use of said apparatus.

* * * * *